United States Patent [19]

Havens, deceased

[11] Patent Number: 4,589,595
[45] Date of Patent: May 20, 1986

[54] PRESSURE COMPENSATED EMITTER

[75] Inventor: Glenn G. Havens, deceased, late of La Mesa, Calif., by Florine P. Havens, Richard C. Thompson, executors

[73] Assignee: Havens International, Inc., San Diego, Calif.

[21] Appl. No.: 581,688

[22] Filed: Feb. 21, 1984

Related U.S. Application Data

[63] Continuation-in-part of Ser. No. 251,180, Apr. 6, 1981, abandoned.

[51] Int. Cl.[4] .......................... B05B 1/02; B05B 1/30
[52] U.S. Cl. ........................... 239/271; 239/533.13; 239/542; 239/547; 138/46
[58] Field of Search ............... 239/533.13, 542, 547, 239/570, 597, 598, 599, 271, 272; 138/45, 46

[56] References Cited

U.S. PATENT DOCUMENTS

| | | | |
|---|---|---|---|
| 2,968,919 | 1/1961 | Hughes et al. | 138/45 X |
| 3,214,102 | 10/1965 | Meyer | 239/533.13 X |
| 3,779,468 | 12/1973 | Spencer | 138/45 X |
| 3,797,741 | 3/1974 | Spencer | 239/542 X |
| 3,837,363 | 9/1974 | Meronek | 239/533.13 X |
| 4,132,364 | 1/1979 | Harmony | 239/533.13 X |
| 4,190,206 | 2/1980 | Atkinson et al. | 239/533.13 X |
| 4,193,545 | 3/1980 | Havens | 239/542 X |

FOREIGN PATENT DOCUMENTS 2088182 6/1982 United Kingdom ............... 239/542

Primary Examiner—Jeffrey V. Nase
Assistant Examiner—Mary Beth O. Jones
Attorney, Agent, or Firm—Brown, Martin & Haller

[57] ABSTRACT

A pressure compensated emitter for irrigation systems and the like includes a generally tubular hard plastic support body for mounting in a port or opening in an irrigation line with a flexible tubular flow control member mounted within the housing with a seal end sealingly engaging a seat in the outlet end of the housing with an inlet port extending toward the inlet opening in the housing with the flow control device being a flexible tubular member having an inlet section of a generally teardrop cross-sectional configuration of a first diameter and a tubular barrel of a second diameter of a generally cylindrical tubular cross section with the inlet section responsive to a first range of pressures and the barrel section responsive to a second range of pressures for regulating and maintaining a substantially uniform flow rate over a range of pressures.

6 Claims, 8 Drawing Figures

U.S. Patent  May 20, 1986  4,589,595

PRESSURE COMPENSATED EMITTER

REFERENCE TO RELATED APPLICATIONS

The present invention is a continuation-in-part of my co-pending application entitled "Pressure Compensator Emitter", Ser. No. 251,180, filed Apr. 6, 1981, now abandoned.

BACKGROUND OF THE INVENTION

The present invention relates to flow control devices and pertains particularly to an improved pressure compensated emitter. Due to the costs of water in many areas of the country because of not only its scarcity, but the costs of processing and transporting the water, drip irrigation systems have come in widespread use. Drip irrigation systems typically place small quantities of water either by a low volume spray or by a drip process at precise locations on or about a plant to supply the plant with only the needed amount of water.

In my aforementioned prior application, I disclosd devices for supplying a uniform amount of water over a large range of water pressures. Such devices are essential for large systems and also for systems on uneven terrains, such as on hillsides and the like. For example, the water pressure can vary by a significant amount, such as 30 to 40 pounds over the length of a system. It is essential under such circumstances that all emitters in the system be capable of delivering the same amount of water over the pressure differential range in the system.

Many attempts have been made in the past to develop systems for regulating the flow rate with varying pressures. Such prior art systems are typically effective over small ranges of pressure and in some instances are effective only over a certain specific range requiring a certain minimum pressure in order to begin regulation and be effective over a particular pressure range.

It is desirable to have the ability to deliver the water at a controlled rate over a larger range from just above zero and in a selectable form such as a drip or a spray, etc. It is also desirable that either the form of dispensing as well as the flow rate be selectable without expensive manufacturing techniques.

SUMMARY AND OBJECTS OF THE INVENTION

It is therefore the primary object of the present invention to provide an improved pressure compensated emitter.

In accordance with the primary aspect of the present invention, a pressure compensated emitter includes a housing having a pre-determined dispensing arrangement and mounting configuration with an open ended tubular chamber in which is mounted a pressure compensating member of a selected flow rate.

BRIEF DESCRIPTION OF THE DRAWINGS

The above and other objects and advantages of the present invention will become apparent from the following description when read in conjunction with the drawings wherein.

DETAILED DESCRIPTION OF A PREFERRED EMBODIMENT

Figure 1:
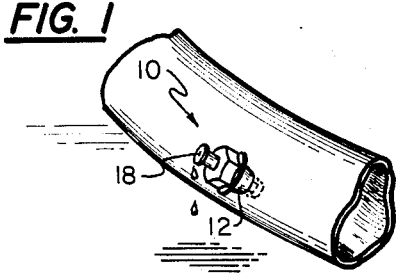
FIG. 1 is a perspective view showing a preferred embodiment of the invention installed.

Referring to FIG. 1 of the drawing, a pressure compensator emitter in accordance with the invention is illustrated and designated generally by the numeral 10. The compensator includes generally hard or rigid housing 12 having a generally tubular configuration with an outer surface having a barb 14 formed at the juncture of an outwardly angled outer surface of the housing and a reduced diameter portion or section which fits small bores or holes in the walls of a tube or the like and a barb 16 near the upper or outer end of the housing. The housing is formed with an outlet end or cap 18 in which is formed a suitable outlet port 29 which extends generally co-axially of the housing communicating on the interior thereof with a generally cylindrical chamber having an open end 24.

The housing is formed on the interior with generally cylindrical inner wall 26 extending the length of the chamber to the inlet 24 and cooperating with a spaced, generally cylindrical, but slightly tapered co-axial projection 28 which cooperates to form an annular wedge-shaped sealing seat 30 which receives the peripheral end of a compensator member wedged within the space between the walls. The annular seat or annulus 30 is slightly tapered to form an increasingly tight sealed fit of the outlet end of the compensator member within the housing. An outlet orifice 29 communicates along the member 28 from the interior of the housing to the end 18 of the housing.

The body is adapted to receive compensators of a selected flow rate such that single housings can be manufactured with the flow rate determined by the flow control member that is selected and installed therein.

Figure 7:
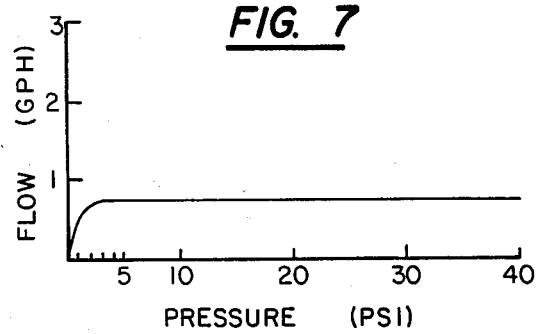
FIG. 7 is a curve of pressure and flow rate of a typical compensator in allowance with the invention.
Figure 2:
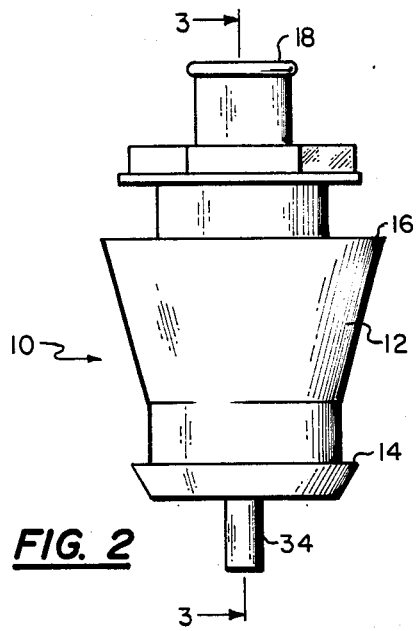
FIG. 2 is a side elevation view showing a preferred embodiment of the housing.
Figure 3:
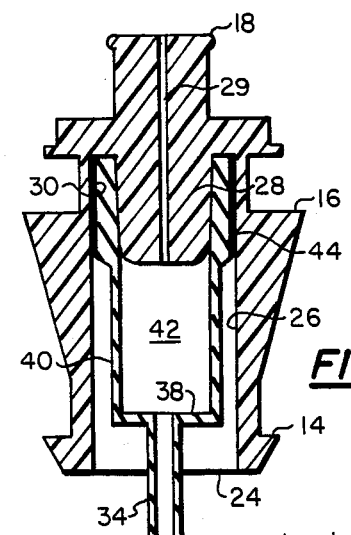
FIG. 3 is a side elevation view in section taken on line 3—3 of FIG. 2.

The flow control member or body designated generally by the numeral 32 is an elongated stepped tubular member of a flexible member such as silicone rubber or the like. The body member 32 has a particular configuration flexibility and dimensions to provide a substantially constant flow rate over an extended pressure range from slightly above 0 psi up to as high as 50 psi as shown in FIG. 7.

Figures 4, 5, 6:
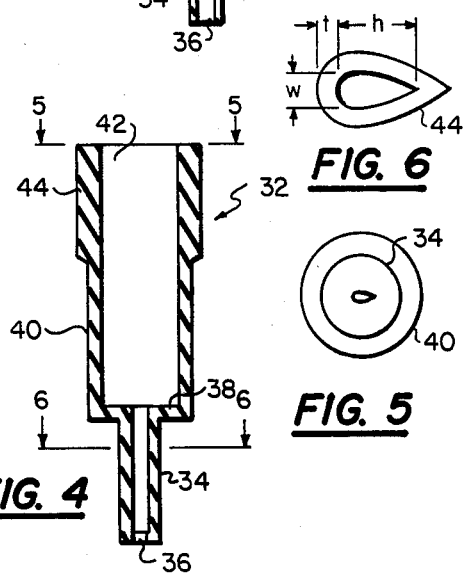
FIG. 4 is a side elevation view in section of the pressure compensating unit.
FIG. 5 is a view taken on line 5—5 of FIG. 4.
FIG. 6 is a section view taken generally on line 6—6 of FIG. 4.

In the illustrated embodiment (FIG. 4), the tubular member 32 is constructed of an inlet portion comprising a tubular portion 34 having an inlet orifice 36 with the inlet orifice and tube 34 having a cross-sectional configuration of a teardrop (FIGS. 5, 6) which connects or steps up at an end wall 38 of the main barrel 40 to the diameter of the main barrel which has an elongated cylindrical tubular configuration with an open outer end 42 surrounded by peripheral seal portion 44 which engages or extends sealingly into the annular sealing seat 30 of the housing 10.

The flow controller construction is such that the orifice section 34, 36 defines or establishes the primary flow rate and is shaped with the teardrop configuration to provide immediate control of the flow rate in response to minor pressure, such as for example between 0 to 1 psi and in most instances is calibrated or constructed to control pressure up to about 10 psi. The teardrop configuration is essentially a pre-collapsed wall construction wherein the inner walls converge together at the v-portion substantially to a common plane. This configuration responds immediately to a differential pressure between the interior and exterior to immediately restrict the orifice in direct relation to pressure differential and establishes a uniform flow rate as shown in FIG. 7 regardless of pressure (within limits). The cross-section of the channel becomes a linear function of external pressure. The teardrop shape is specific to the efficient control of uniform fluid flow with varying pressure ranges.

The teardrop shape is defined by a family of curves know as sin generated curves of the family:

a=K sin (s), where s is the distance around the orifice in radians, a is the angle to the tangent of the curve, and K is a constant for the particular orifice varying from 100 to 120.

The barrel tubular section 40 takes over at a pressure just below the upper limits of control by the orifice section and begins controlling at about 9 psi (for example) up to an upper limit which may be on the order of about 40 or 50 psi. The barrel section 40 collapses into a substantially figure-8 configuration at about 9 psi during its control mode thereby forming a double teardrop configuration.

The inlet orifice section of the compensator can be selected to provide any number of rates of flow. The emitter body or controller can be manufactured to have any number of orifice sizes for any selected flow desired and those can be selected to fit a standard emitter case or body. The pressure compensator body can be color coded for the various flow rates, such as for example, red for a 0.5 gph, green for 1.0 gph and blue for 1.5 gph. The pressure compensator body has a length exceeding that of the emitter case and thereby extends from the case into the center of the supply tube or line. The compensator body can thus be seen and the flow rate thereof ascertained from the color.

The compensated unit has specific dimensions calibrated or calculated to provide the desired flow rate and can provide a flow rate as shown by the curve in FIG. 7 of a substantially flat or uniform flow rate over an extended period from just slightly above 0 along a line of maximum flow rate that is maintained substantially constant out to approximately 40 or 50 psi. In other words, the compensator allows the flow rate to reach maximum very quickly and maintains that rate, not going above or below that rate over the extended control range. The relationships of the cross-sectional dimension and of the flow control body is governed by the relationship between the wall thickness of the body, the internal diameter and the length of the barrel of the section. The specific shape (i.e. teardrop) is selected to yield the required flow at the lowest pressure based on area, pressure, viscosity of the fluid, and orifice coefficient. The area can be determined experimentally.

The wall thickness and modulus of elasticity of the orifice material is selected such that a constant flow is maintained as a function of pressure as the orifice reduces under increasing pressures.

The teardrop configuration, when formed from an elastomer, is the only shape that can satisfy all of the above conditions.

Flow rates up to approximately 5 or 10 gals and 15-18 psi can be economically handled by the teardrop orifice.

The precision of fabrication of the orifice increases as a function of pressure. If an elastomeric tube is connected immediately downstream from the orifice, and designed such that it will buckle at between 3 and 12 psi forming a figure-eight cross section, the required precision of the orifice can be reduced and still maintain precise compensation even at extended pressures.

Figure 8:
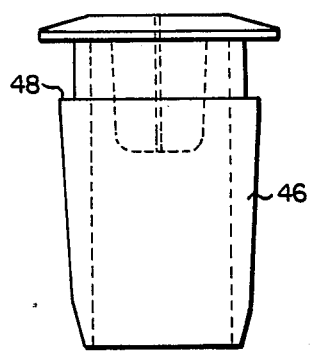
FIG. 8 is a view like FIG. 2 showing an alternate embodiment.

The function of the buckling tube is to maintain a constant pressure drop across the orifice. The conditions of the tubular section will fit the general family of curves:

$$P_c = \frac{2.42\,E}{(1-\mu^2)^{\frac{3}{4}}} \frac{(t/D)^{5/2}}{\left[\frac{L}{D} - 0.45\,(t/D)^{\frac{1}{2}}\right]^2} \qquad \text{Equation 1}$$

where
$P_c$ = collapsed pressure, psi
$E$ = modulus of elasticity
$\mu$ = Poisson's ratio for the material
$t$ = thickness
$D$ = neutral diameter of the tube
$L$ = length of the tube Referring to FIG. 8, an alternate embodiment of the emitter housing is illustrated wherein the housing 46 is substantially cylindrical in configuration with the interior of the housing being identical to that of the previous embodiment. The exterior of the housing includes a barb 48 at the top or outlet end for engaging and mounting in a bore or hole in a tube for engaging and holding the compensator unit further within the tube with only a minor portion of the outlet end thereof extending from the tube. This enables mounting such that the body of the emitter may extend further into the tube and is substantially protected therein. By way of an example of dimensions, an emitter case or body may have a length of approximately 0.440 inches with an interior diameter of about 0.200 inches and an orifice diameter of about 0.040 inches.

The emitter or compensator body 32 for a 1 gallon per hour unit would have an inlet or orifice section 34 length of about 0.174 inches with an inlet 36 and interior diameter height h of 0.032 and width w of 0.012 inches with a length of about 0.174 inches. The walls thickness would be about 0.016 with the thickness of wall 40 of the barrel section being approximately the same. The diameter of the section 40 being about 0.141 inches with a length of about 0.20 inches. The length of the seal section 44 may be on the order of about 0.15 inches. The orifice section 34 would be scaled up or downwardly accordingly to provide the desired flow rate. The entire compensator body or unit can be scaled up or down.

While I have illustrated and described my invention by means of specific embodiments, it is to be understood that numerous change and modifications may be made therein without departing from the spirit and scope of the invention as defined in the appended claims.

I claim:

1. A two-stage liquid flow regulator for maintaining a predetermined, substantially constant fluid flow rate over a wider pressure range than either stage independently comprising:

first stage regulation means having a first stage response range from zero to a second higher pressure such that as fluid source pressure varies from zero to a first pressure between zero and said second higher pressure, the flow rate increases from zero to a maximum flow rate and as fluid source pressure varies from said first pressure to said second higher pressure, said maximum flow rate is substantially maintained comprising:

a first elastic tubular member having an inlet end, an outlet end, and a tear-dropped shaped bore therebetween; and second stage regulation means connected to the outlet end of said first stage regulating means having a second stage response range overlapping said first stage response range from a fluid pressure between said first pressure and said second pressure to a third pressure greater than the first stage response range for substantially maintaining the same predetermined maximum fluid flow rate over the second stage response range wherein said second stage regulation means comprises: a second elastic tubular member having an inlet end connected to said outlet end of said first tubular member, an outlet end, and a bore therebetween, said bore of said second tubular member is cylindrical in cross-section and collapses to double teardrop configuration between said first and second pressures.

2. The flow control regulator of claim 1 including a housing in which said second tubular member is mounted, said housing including an annular seat sealingly engaged by the outlet end of said second tubular member.

3. The flow control regulator of claim 1 wherein:
said first tubular member has a generally uniform wall thickness.

4. The flow control regulator of claim 1 wherein:
said second tubular member has a generally uniform wall thickness.

5. The flow control regulator of claim 1 wherein:
the wall thickness of said first and second tubular members are substantially the same.

6. The flow control regulator of claim 1 wherein said outlet end of said second tubular member includes annular seal means for annually engaging a support housing.

* * * * *

UNITED STATES PATENT AND TRADEMARK OFFICE
CERTIFICATE OF CORRECTION

PATENT NO. : 4,589,595

DATED : May 20, 1986

INVENTOR(S) : GLENN G. HAVENS

It is certified that error appears in the above-identified patent and that said Letters Patent is hereby corrected as shown below:

Column 6, line 20, claim 6, delete "annually" and insert --annularly-- therefor.

Signed and Sealed this

Fourth Day of November, 1986

[SEAL]

Attest:

DONALD J. QUIGG

Attesting Officer

Commissioner of Patents and Trademarks